Figure 1:
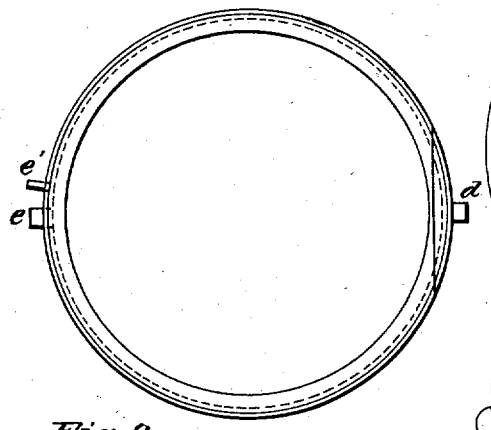

J. F. WATSON.

Watch Case.

No. 587. Reissued Aug. 17, 1858.

N. PETERS. Photo-Lithographer, Washington, D. C.

UNITED STATES PATENT OFFICE.

W. E. BALDWIN AND E. BLISS, OF NEWARK, NEW JERSEY, ASSIGNEES OF JOHN F. WATSON.

IMPROVEMENT IN WATCH-CASES.

Specification forming part of Letters Patent No. 19,972, dated April 13, 1858; Reissue No. 587, dated August 17, 1858.

*To all whom it may concern:*

Be it known that JOHN FORREST WATSON, of St. John Square, Clerkenwell, in the county of Middlesex, England, and a subject of the Queen of Great Britain, has invented certain new and useful Improvements in Watch-Cases, of which the following is a clear, full, and exact description, reference being made to the accompanying drawings, forming part of this specification.

This improvement in watch-cases relates to that class known as "magic hunter-case," which, as is well known, consists of two cases, an interior and an exterior. The interior holds the works of the watch, and is furnished with a metallic back and a glazed dial front. The exterior is composed of a ring for holding the body of the watch, with an open frame hinged to one side, and a closed back to the opposite. The pendant is attached to the interior case and extends through a socket in the ring of the outer case, and the inner case is so arranged that it can be reversed in the outer by being taken out, so that the dial may face either the open frame or the closed back of the outer case, thus forming an open-face or hunting watch.

This improvement in watch-cases consists, first, in attaching the pendant (in double-case watches) to the outer instead of the inner case, thus leaving the inner case and its attachments to the outer, free of the pendant, whereby its position, and consequently the position of the figures on the dial-plate when it is reversed in the outer case to form either a hunting or open-face watch, is not controlled by the pendant as has heretofore been the case; second, connecting the inner case with the ring of the outer case, so that the inner case containing the works and dial can be reversed and held within the ring of the outer case to exhibit either the back or the face through the bezel, and so that the inner case in either position may be held in the ring of the outer case independent of the closing of the outer case; third, in shifting the dial one-quarter of a circle in reversing the inner case containing the works and dial of the watch in the outer case by so arranging the socket for the spring-catches which connect the cases with each other that on reversing the inner case in the outer to form either an open-face or hunting watch the figure XII of the dial is placed at right angles to the pendant when the dial faces the closed back, as in ordinary hunting-watches and at the pendant when the dial faces the open bezel as in ordinary open-face watches; fourth, constructing the outer case with an interior flange or rib in connection with a flange or projection around the body of the watch when the rib on the outer case is so arranged as to sustain the body of the watch, whether the face is opposite to the open ring or the closed back.

In the accompanying drawings is represented a watch-case embracing my improvements, in which—

Figure 4:
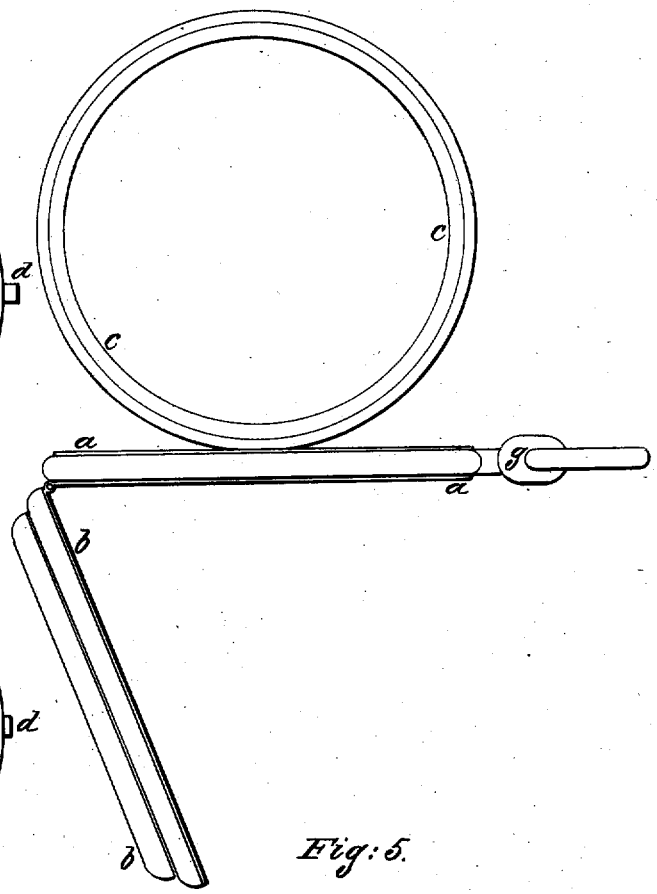
Figure 2:
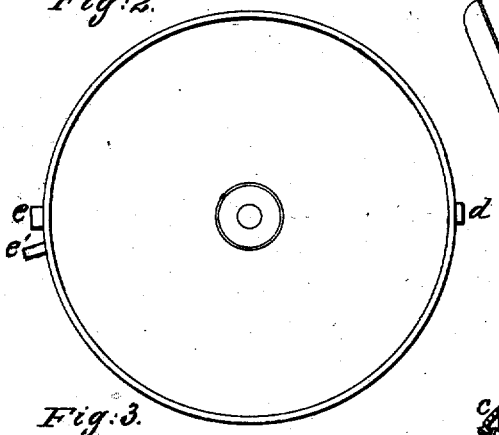
Figure 3:
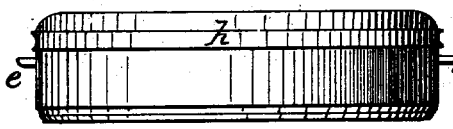
Figure 5:
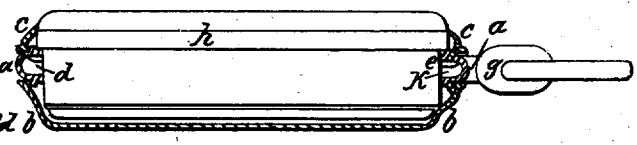

Figure 1 represents a front view of the inner case in which the works of the watch are inclosed. Fig. 2 represents a back view of the same, and Fig. 3 represents an edge view. Fig. 4 represents a side view of the outer case open. Fig. 5 represents an edge view of the cases connected, the outer case being in sections.

My improved case consists of two parts or cases, one inclosed within the other, the interior holding the works and forming the body of the watch; and it is so arranged that it can be reversed in the ring of the exterior case to face in either direction. The exterior case consists of a ring, *a*, to which is attached a pendant or handle, *g*, and a metal back, *b*, is hinged to one side of the ring *a*, and closes upon it in the usual manner in watches, and to the opposite side an open ring or bezel, *c*, is hinged. A rib or projection is formed on the interior of the ring for a bed to receive a projecting rib, *h*, around the body of the watch. The interior case is provided with a glazed front covering the dial and a closed back. On the outside of the ring of this case are two spring-catches, *d* and *e*, which retain it to the ring of the outer case by catching into a circular groove, K, extending around the interior of the ring *a*, which admit of the catches entering the groove at different points in order to shift the dial one-quarter of a circle in reversing the inner case in the outer, while at the same time a circular enlargement or flange, *h*, on the inner case rests on the rib or edge of the ring *a*. The inner case containing the works of the watch can be put into the ring

*a* either so that the glass of the inner case faces the open ring or bezel *c* of the outer case, with the figure XII of the dial-plate at the pendant, (then the watch resembles an ordinary open-face watch,) or so that the metal back of the inner case appears through the open bezel *c*, with the figure III of the dial at the pendant and the figure XII at right angles thereto; then the watch resembles a hunting-watch. In either position in which the inner case is put into the outer the flange on the inner case rests upon the interior rib or edge of the ring *a* of the outer case, and the spring-catches *d* and *e* retain it to the outer case without closing the bezels.

In order to remove the inner from the outer case, it is necessary to press on a projection, *e'*, which withdraws the catch *e*, when the inner case can be raised and taken out. Thus it will be seen that the inner case can be readily reversed in the ring of the outer case and therein held, notwithstanding the outer case may be open; and as the pendant is connected with the ring of the outer case instead of that of the inner, and as the arrangement of the groove in the outer case admits of the catches entering it at different points, the dial is shifted one quarter of a circle to bring the figure XII in the proper position in relation to the pendant in reversing the inner case in the outer to form either a hunting or open-face watch.

Another advantage resulting from attaching the pendant to the ring of the outer instead of the ring of the inner case is that the labor and expense of fitting the ring of the outer case around the shank or neck of the pendant is avoided.

Having thus described this improvement in watch-cases, what is claimed therein as new, and desired to be secured by Letters Patent, is—

1. Attaching the pendant in double-case watches permanently to the ring of the outer case, substantially as and for the purpose specified.

2. Connecting the inner case with the ring of the outer case, so that the inner case containing the works and dial can be reversed and held within the ring of the outer case to exhibit either the back or the dial through the bezel, and so that the inner case may be held in the ring of the outer case independently of the closing of the outer case, as set forth.

3. In reversing the inner case containing the works and dial in the outer case to present the dial on either side, shifting the dial one-quarter of a circle, substantially as herein described, or by equivalent means, so that the figures of the dial may be properly located relatively to the pendant for either the ordinary open-face watch or the ordinary hunting-watch.

4. Forming the ring of the inner with a flange or rib, substantially as described, in combination with a corresponding flange, rib, or rest on the ring of the outer case, to give the required support to the inner case within the outer case when reversed to present the dial in either direction, as set forth.

In testimony whereof we have subscribed our names.

WICKLIFFE E. BALDWIN.
ELIHU BLISS.

Witnesses:
RICHARD A. MCCURDY,
THOMAS G. BROWN.